United States Patent [19]

Saga

[11] Patent Number: 5,771,214
[45] Date of Patent: Jun. 23, 1998

[54] OPTICAL INFORMATION RECORDING/ REPRODUCING APPARATUS CAPABLE OF DETECTING TRACKING AND/OR FOCUSING ERROR AND METHOD THEREFOR

[75] Inventor: Yoshihiro Saga, Yokohama, Japan

[73] Assignee: Canon Kabushiki Kaisha, Tokyo, Japan

[21] Appl. No.: 788,827

[22] Filed: Jan. 27, 1997

[30] Foreign Application Priority Data

Jan. 26, 1996 [JP] Japan .................................. 8-011454

[51] Int. Cl.[6] ..................................................... G11B 7/00
[52] U.S. Cl. .................................. 369/44.29; 369/44.25; 369/44.26
[58] Field of Search ........................... 369/44.25, 44.26, 369/44.27, 44.29, 44.35, 44.31

[56] References Cited

U.S. PATENT DOCUMENTS

| 4,786,794 | 11/1988 | Dai ......................................... 369/44.25 |
| 5,184,337 | 2/1993 | Rokutan ................................ 369/44.25 |
| 5,185,730 | 2/1993 | Komaki et al. ........................ 369/44.26 |
| 5,199,022 | 3/1993 | Suzuki et al. .......................... 369/275.1 |
| 5,357,496 | 10/1994 | Ikeda et al. ............................ 369/44.29 |
| 5,568,461 | 10/1996 | Nishiuchi et al. ..................... 369/44.26 |

FOREIGN PATENT DOCUMENTS 61-29423  2/1986  Japan .

Primary Examiner—Thang V. Tran
Attorney, Agent, or Firm—Fitzpatrick, Cella, Harper & Scinto

[57] ABSTRACT

In an optical information recording/reproducing apparatus capable of executing a first recording method for recording information on either one of a land portion and a groove portion of a recording medium and a second recording method for recording information on both of the land portion and the groove portion, the recording medium is irradiated with a light beam, and a tracking error signal and/or focusing error signal is generated from the reflected light upon irradiation of the light beam. The level of the error signal is compared with a reference level to detect a tracking error state and/or focusing error state. The reference level is adapted to be switched according to the first or second recording method.

5 Claims, 6 Drawing Sheets

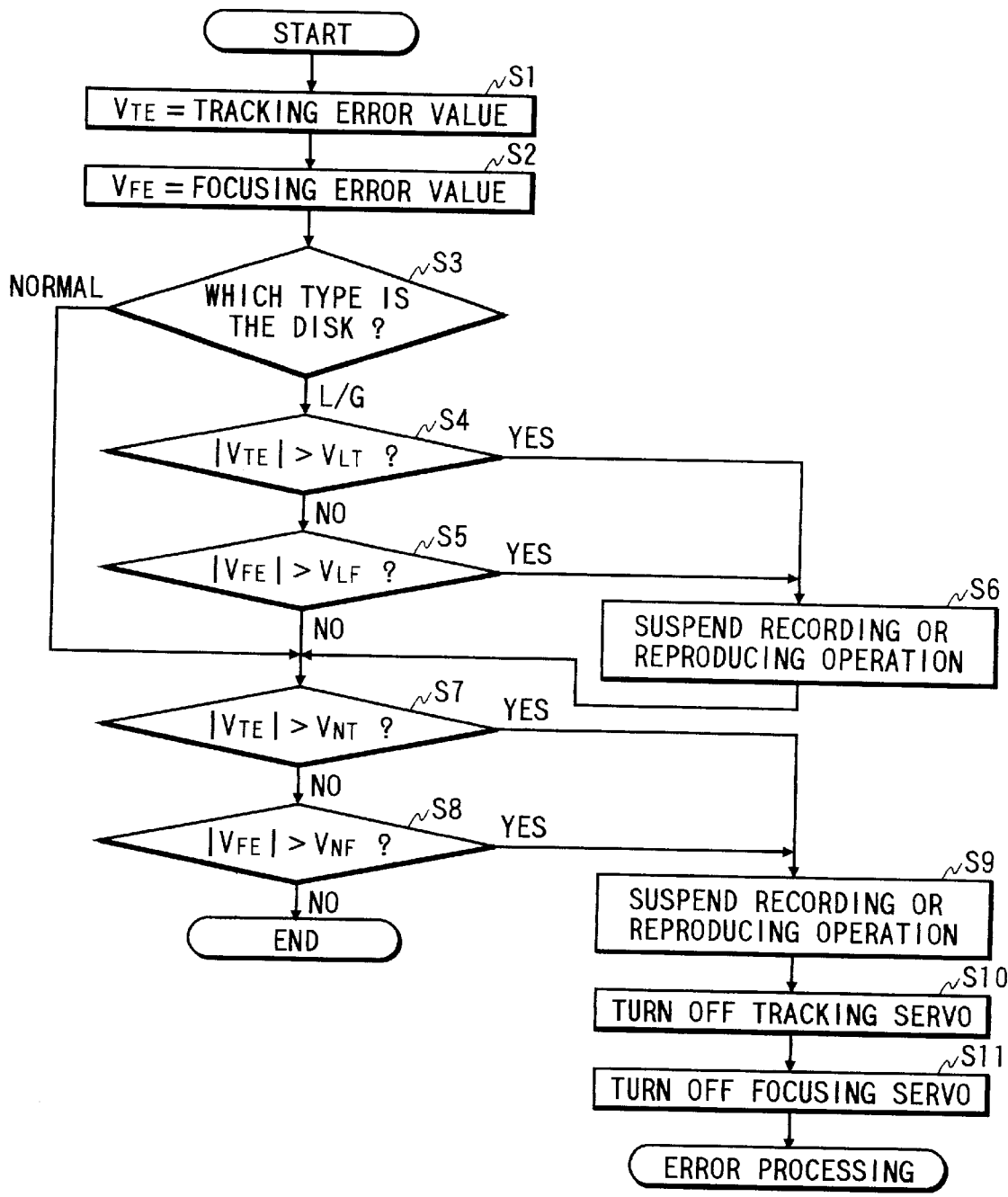

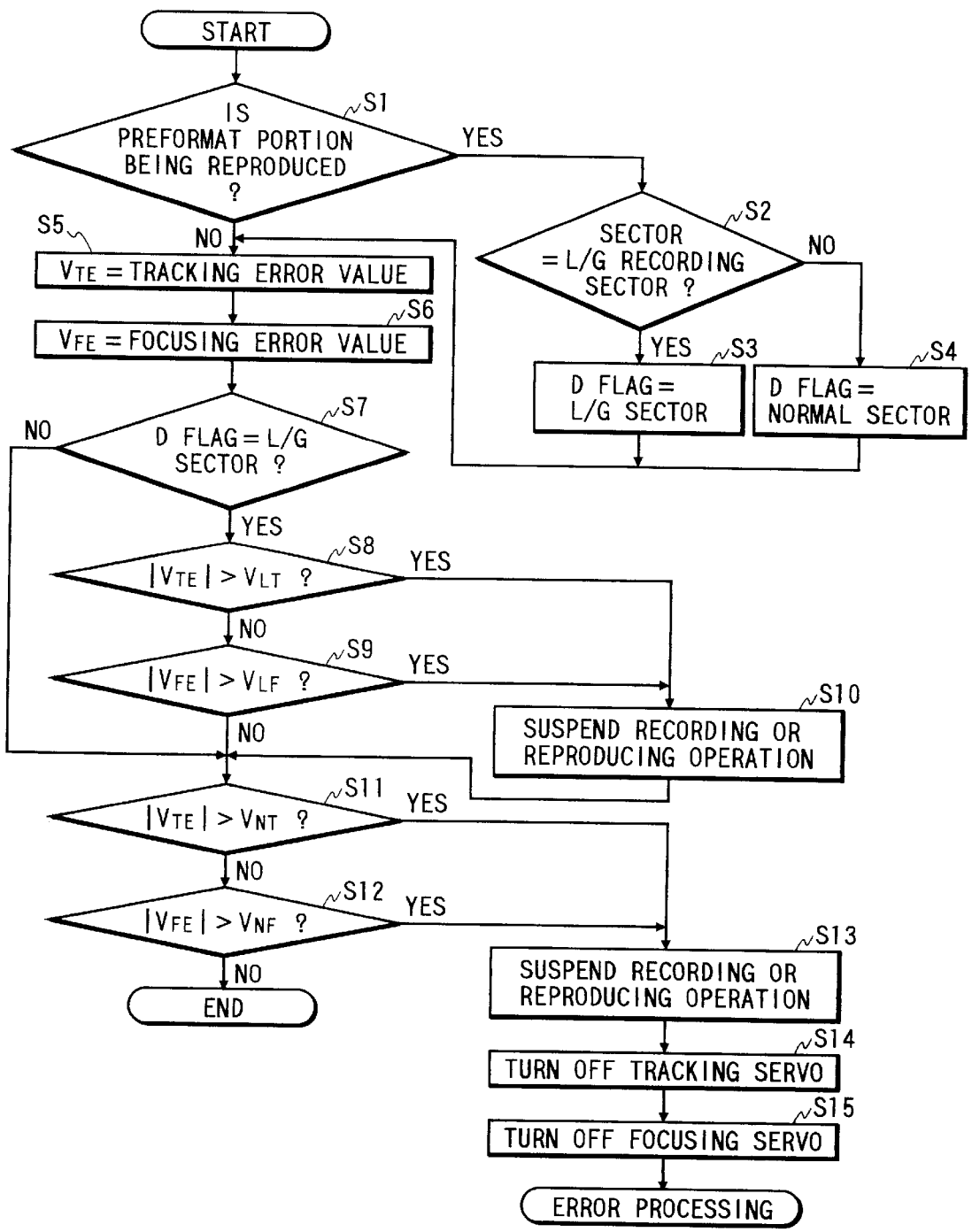

OPTICAL INFORMATION RECORDING/REPRODUCING APPARATUS CAPABLE OF DETECTING TRACKING AND/OR FOCUSING ERROR AND METHOD THEREFOR

BACKGROUND OF THE INVENTION

1. Field of the Invention

The present invention relates to an optical information recording/reproducing apparatus for optically recording information on or reproducing recorded information from an information recording medium such as an optical disk.

2. Related Background Art

In the conventional optical disk, it is customary to record information on a recessed portion or a protruding portion of a track. In such ordinary optical disk, with a reduction in the track pitch for increasing the recording capacity, there will result a leakage of the light beam into the adjacent track. For this reason, the signal from the adjacent track becomes mixed in the reproduced signal (this phenomenon being hereinafter called crosstalk) so that the reproduced signal is deteriorated in quality and the reproduction of the information eventually becomes impossible.

On the other hand, for increasing the recording capacity of the optical disk, there is already known so-called land/groove recording in which, as disclosed in the Japanese Patent Laid-Open Application No. 61-29423, information is recorded on both recessed and protruding portions of the track of the disk, namely on the land portion and the groove portion of the track. In such land/groove recording, it is possible to reduce an interference between a track subjected to reproduction and a track adjacent thereto by setting the depth of the groove of the track at an optimum value, thereby eliminating the crosstalk from the adjacent track.

In such case, the information recording is also possible in the following manner, though the crosstalk reducing effect cannot be obtained in the information recording or erasure. Specifically, in information recording, a recording layer of an optical disk is irradiated with a condensed light beam, so as to heat the recording layer to a temperature above the Curie temperature thereof. In this state, the light spot formed by the light beam is higher in temperature at the center thereof but becomes lower in temperature toward the periphery of the light spot, so that a recording mark is formed only in the central portion of the light spot, heated at least equal to the Curie temperature. Consequently the width of the recording mark is formed smaller than the diameter of the light spot. Therefore, the information recording is possible even if the distance between a track subjected to recording and a track adjacent thereto is smaller than the size of the light spot, as long as the track-to-track distance remains equal to or larger than the width of the recording mark in a direction perpendicular to the direction of the tracks.

However, various drawbacks are encountered if information recording and reproduction are intended with a single information recording/reproducing apparatus, utilizing two different types of disks which are the ordinary optical disk in which information is recorded either one of the recessed and protruding portions of the track and an optical disk in which information is recorded on both the recessed and protruding portions of the track. In the following such drawbacks will be explained in more details. FIG. 1 is a chart showing the relationship between the position of the light spot on the disk and the tracking error signal, wherein points a and c indicate the centers of groove portions of the tracks, respectively, and points b and d indicate the centers of land portions, respectively.

In FIG. 1 it is assumed that information recording is executed on an ordinary optical disk, by irradiating a land portion having the center at the point b with a light beam. Now let us consider a situation where, in the course of information recording, an external perturbation such as a vibration from the outside or a scar on the disk is applied whereby an objective lens for condensing the light beam is displaced toward the point c. Since the point c belongs to the groove portion where no information is recorded, destruction of the recorded data does not take place. However, if the recording light spot further moves to a position between the points c and d, the recording light spot irradiates a part of the land portion having its center at the point d, thereby overwriting the data recorded therein and thus causing destruction of the recorded data.

Also there is considered a situation of displacement of the objective lens toward the point c by a similar external perturbation, in the course of information recording on a land/groove recording disk by irradiating the land portion, having its center at the point b shown in FIG. 1, with the recording light spot. In this case, since the data are recorded also on the groove portion at the point c, a displacement by at least $\lambda_L$ to an intermediate position between the points b and c causes destruction of the recorded data on the adjacent groove portion. In case of land/groove recording, the destruction of the recorded data may result even by a slight movement of the recording light spot as explained above.

Also in the land/groove recording, the elimination of crosstalk is possible when the recording or reproducing light spot is positioned at the center of the recessed or protruding portion of the track. However, if the recording or reproducing light spot is displaced even slightly from the center of the recessed or protruding portion of the track (such situation being hereinafter called detracking), the influence of the crosstalk cannot be disregarded as the information is recorded both on the recessed and protruding portions, and, the reproduction of the information becomes impossible in the worst case.

In the following there will be explained drawbacks encountered in case of an abnormality in the focusing control, with the ordinary optical disk and with the land/groove recording optical disk. FIG. 2 shows the focus error signal, wherein the abscissa indicates the distance between the objective lens and the surface of the disk while the ordinate indicates the amplitude level of the focus error signal. The focusing control is generally possible when the distance, between the objective lens and the surface of the disk as shown in FIG. 2, is within a range between the maximum and minimum values of the focus error signal around the just-in-focus position. With the ordinary optical disk, in case the distance between the objective lens and the disk surface goes outside the focus control range because of an external perturbation such as vibration in the course of information recording or reproduction, the focus control becomes difficult and the information recording or reproduction eventually becomes impossible. Such situation is called uncontrolled focusing state.

On the other hand, with the land/groove recording optical disk, if a defocus state, indicating an out-of-focus state of the light beam, is generated in the course of recording or erasing operation, the diameter of the light beam spot increases and the width of the recording mark may exceed that of the land or the groove. In such case, there results data destruction by erroneous overwriting or erasure of the data recorded on the adjacent track. Also such defocus state generated in the course of a reproducing operation increases the crosstalk, thus rendering the reproduction of information difficult.

As explained in the foregoing, in the event of an abnormality in the tracking control and the focus control due for example to an external perturbation, the data destruction may result in the land/groove recording disk even with a smaller detracking or defocusing in comparison with the case of the ordinary optical disk. Such data destruction may be avoided by detecting such detracking or defocusing and interrupting the recording or reproducing operation upon detection, but the ordinary optical disk and the land/groove recording optical disk are not mutually compatible in effecting the recording and reproducing operation in a single information recording/reproducing apparatus with such two kinds of disks. More specifically, if the level of detection for detracking or defocusing is set according to the land/groove recording optical disk, there is detected even a slight detracking or defocusing that does not cause data destruction or erroneous data reproduction on the ordinary optical disk, thus unnecessarily interrupting the recording or reproducing operation.

SUMMARY OF THE INVENTION

In consideration of the foregoing, the object of the present invention is to provide an optical information recording/reproducing apparatus capable of setting a detection level for the detracking and the defocusing according to the kind of the recording medium, thereby detecting the detracking and the defocusing at an optimum detection level for each recording medium.

The above-mentioned object can be attained, according to the present invention, by an optical information recording/reproducing apparatus capable of executing a first recording method for recording information on either one of the land portion and the groove portion and a second recording method for recording information on both of the land portion and the groove portion, the apparatus comprising:

means for irradiating a light beam for the information recording;

means for generating a tracking error signal and/or a focusing error signal from the reflected light of the above-mentioned light beam;

means for detecting a tracking error state and/or a focusing error state of the light beam, by comparing the levels of the above-mentioned error signals with reference levels; and means for switching the reference levels according to the recording method mentioned above.

According to the present invention, there is also provided an optical information recording/reproducing method capable of executing a first recording method for recording information on either one of the land portion and the groove portion and a second recording method for recording information on both of the land portion and the groove portion, the method comprising:

a step of irradiating a light beam for the information recording;

a step of generating a tracking error signal and/or a focusing error signal from the reflected light of the light beam;

a step of detecting a tracking error state and/or a focusing error state of the light beam, by comparing the levels of the error signals with reference levels; and a step of switching the reference levels according to the recording method mentioned above.

Other objects of the present invention, and the features thereof, will become fully apparent from the following detailed description of the embodiments.

BRIEF DESCRIPTION OF THE DRAWINGS

FIG. 5 is a flow chart showing the function of the embodiment shown in FIG. 4; and FIG. 6 is a flow chart showing a third embodiment of the present invention.

DETAILED DESCRIPTION OF THE PREFERRED EMBODIMENTS

Figure 3:
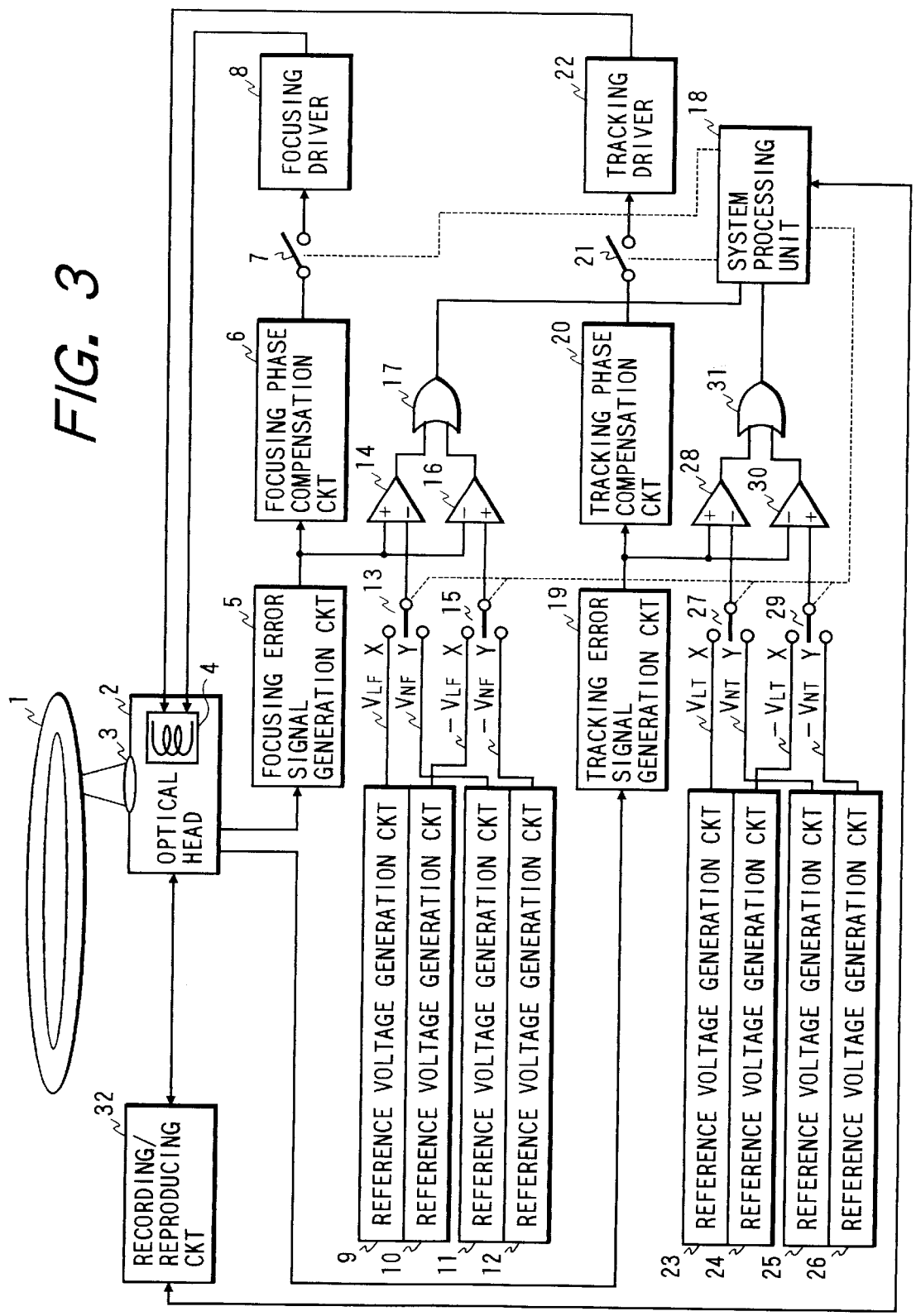
FIG. 3 is a block diagram showing the configuration of a first embodiment of the optical information recording/reproducing apparatus of the present invention.

Now the present invention will be clarified in detail by preferred embodiments thereof, with reference to the attached drawings. FIG. 3 is a block diagram showing a first embodiment of the optical information recording/reproducing apparatus of the present invention, wherein an optical disk 1, constituting an information recording medium, is rotated at a predetermined speed by an unrepresented spindle motor. In the optical disk 1, there is previously given class information indicating whether it is a disk for recording information on either one of the land portion and the groove portion of the track or a disk for recording information on both of the land portion and the groove portion. In the present embodiment, such class information is recorded in a predetermined recording area, such as a control track, of the disk.

Below the optical disk 1 there is provided an optical head 2 for irradiating an information recording light beam or an information reproducing light beam. The optical head 2 includes a semiconductor laser (not shown) constituting a light source, an objective lens 3 for condensing the laser beam emitted from the semiconductor laser to irradiate the optical disk 1 with a small light spot, an actuator 4 for moving the objective lens 3 in a tracking direction and a focusing direction with respect to the optical disk 1, and a photosensor (not shown) for receiving the laser beam reflected from the optical disk 1. The actuator 4 is composed of a focusing actuator for moving the objective lens 3 in the focusing direction, and a tracking actuator for moving the objective lens 3 in the tracking direction.

Figure 2:
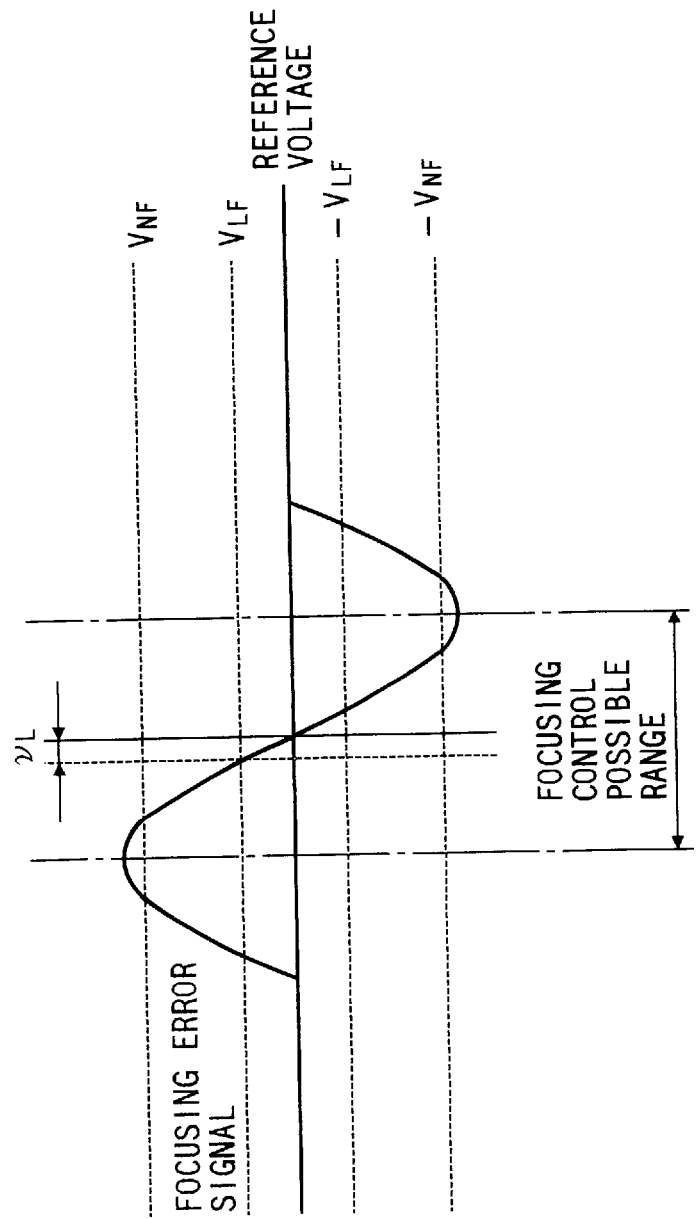
FIG. 2 is a chart showing the relationship between the distance from the objective lens to the surface of the optical disk and the focusing error signal.

A focusing error signal generation circuit 5 serves to generate a focusing error signal as shown in FIG. 2, based on a light reception signal from the photosensor in the optical head 2. The focusing error signal can be detected, for example, by the astigmatism method. The focusing error signal generated in the focusing error signal generation circuit 5 is supplied to a/focusing driver 8 through a focusing phase compensation circuit 6 for stabilizing the focusing servo, and a switch 7 for turning on and off a focusing servo loop. Then the focusing driver 8 drives the focusing actuator in the optical head 2 to move the objective lens 3 in the focusing direction, thereby achieving focus control so as to focus the light beam onto the surface of the rotating disk. In the present embodiment, there is also provided a focusing abnormality detection circuit for detecting a defocus state or an uncontrolled focusing state by comparing the focusing error signal with a predetermined reference voltage. More specifically, it effects detection according to the kind of the optical disk, and detects the uncontrolled focusing state in case of an ordinary optical disk but the defocus state in case of a land/groove recording optical disk since the recording or reproduction is affected even by a slight defocus.

The defocus state and the uncontrolled focusing state are detected by the comparison of the amplitude of the focusing error signal with respective predetermined voltage ranges and when the amplitude goes out of such voltage ranges. In the present embodiment, the voltage ranges for identifying the defocus state and the uncontrolled focusing state are switched according to the kind of the optical disk to be used. More specifically, reference voltage generation circuits 9, 10 correspond to the land/groove recording optical disk for recording information on both of the land portion and the groove portion, and respectively generate an upper limit reference voltage and a lower limit reference voltage of the predetermined voltage range.

The upper limit reference voltage generated by the reference voltage generation circuit 9 is selected at $V_{LF}$ as shown in FIG. 2, and the lower limit reference voltage generated by the reference voltage generation circuit 10 is selected at $-V_{LF}$. Thus, in the present embodiment, in case of the land/groove recording, the defocus amount having significant influence on the information recording or reproduction is selected as $v_L$ in both focusing directions as shown in FIG. 2, and the upper limit reference voltage $V_{LF}$ and the lower limit reference voltage $-V_{LF}$ for the focusing error signal correspond to these defocus amounts. In this case the defocus amount $v_L$ corresponds to a value where the width of the recording mark to be formed becomes larger than that of the land portion or the groove portion.

Also reference voltage generation circuits 11, 12 correspond to the ordinary optical disk for recording information on either one of the land portion and the groove portion, and respectively generate an upper limit reference voltage and a lower limit reference voltage of the predetermined voltage range. The upper limit reference voltage generated by the reference voltage generation circuit 11 is selected at $V_{NF}$ which is somewhat smaller than the maximum value of the focusing error signal as shown in FIG. 2, and the lower limit reference voltage generated by the reference voltage generation circuit 12 is selected at $-V_{NF}$ which is somewhat larger than the minimum value of the focusing error signal.

Either one of the output voltages of the reference voltage generation circuits 9, 11 for generating the upper limit reference voltages of the predetermined voltage ranges is selected by a switch 13 and is compared in a comparator 14 with the focusing error signal. Also either one of the output voltages of the reference voltage generation circuits 10, 12 for generating the lower limit reference voltages of the predetermined voltage ranges is selected by a switch 15 and is compared in a comparator 16 with the focusing error signal. The comparator 14 releases a high-level output signal when the focusing error signal exceeds the upper limit reference voltage while the comparator 16 releases a high-level output signal when the focusing error signal becomes smaller than the lower limit reference voltage, and the output signals of these comparators 14, 16 are logically summed in an OR gate 17 and supplied to a system process unit 18. A high-level output signal from the OR gate 17 interruptes the recording or reproducing operation, as will be explained later in more details.

A tracking error signal generation circuit 19 generates a tracking error signal, based on the light reception signal from the photosensor in the optical head 2. The generated tracking error signals is supplied to a tracking driver 22 through a tracking phase compensation circuit 20 for stabilizing the tracking servo and a switch 21 for turning on and off a tracking servo loop. Then the tracking driver 22 drives the tracking actuator in the optical head 2 to move the objective lens 3 in the tracking direction, thereby achieving tracking control in such a manner that the light beam emitted from the optical head 2 follows the information track on the surface of the rotating disk 1. In the present embodiment, there is also provided a tracking abnormality detection circuit for detecting a detracking (track deviation) state or a track skipping by comparing the tracking error signal with a predetermined reference voltage. It effects detection according to the kind of the optical disk, and detects the track skipping in case of an ordinary optical disk but the detracking state in case of a land/groove recording optical disk since the data destruction is caused even by a slight detracking.

Figure 1:
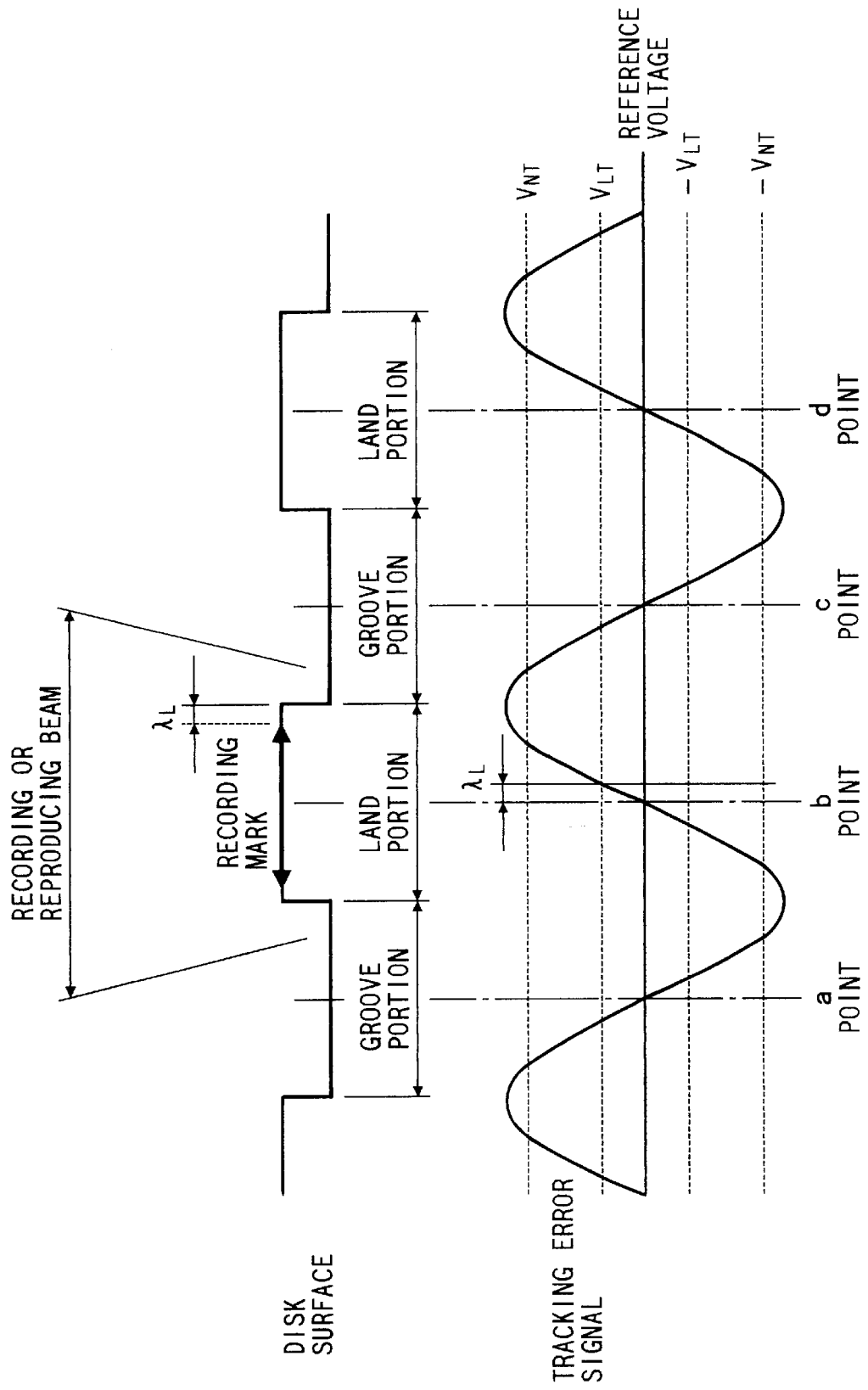
FIG. 1 is a view showing the relationship between tracks on the surface of an optical disk and the tracking error signal.

More specifically, reference voltage generation circuits 23, 24 serve to generate upper and lower limit reference voltages of the predetermined voltage range for detecting the detracking in the land/groove recording optical disk and respectively generate an upper limit reference voltage and a lower limit reference voltage of the predetermined voltage range. As shown in FIG. 1, the upper limit reference voltage is selected at $V_{LT}$ while the lower limit reference voltage is selected at $-V_{LT}$. Thus, in case of the. land/groove recording, the detracking amount having significant influence on the information recording or reproduction is selected as $\lambda_L$ as shown in FIG. 1. As shown in FIG. 1, the detracking amount $\lambda_L$ corresponds to about ½ of the difference between the width of the land portion or the groove portion of the track and that of the recording mark. The data destruction results when the light spot is displaced by $\lambda_L$ from the center of the land or groove portion as explained in the foregoing. Consequently the upper and lower limit reference voltages $V_{LT}$, $-V_{LT}$ of the predetermined voltage range correspond to the amplitude of the tracking error signal when the light spot is displaced by $\lambda_L$ in both lateral directions from the center of the land or groove portion.

Reference voltage generation circuits 25, 26 serve to generate upper and lower limit reference voltages of the predetermined voltage range for detecting the detracking in the ordinary recording optical disk and respectively generate an upper limit reference voltage and a lower limit reference voltage of the predetermined voltage range. As shown in FIG. 1, the upper limit reference voltage is selected at $V_{NT}$ which is somewhat smaller than the maximum value of amplitude of the tracking error signal, while the lower limit reference voltage is selected at $-V_{NT}$ which is somewhat larger than the minimum value of amplitude of the tracking error signal. In this case, the detracking amount of the light spot in the detection of the track skipping is about ¼ of the distance between the centers of the adjacent land portions (distance between points b and d in FIG. 1) or about ¼ of the distance between the center of the adjacent groove portions (distance between points a and c in FIG. 1). Consequently the upper and lower limit reference voltages $V_{LT}$, $-V_{LT}$ of the predetermined voltage range for detecting the track skipping correspond to the amplitude of the tracking error signal when the light spot is displaced by ¼ of the above-mentioned distance in either lateral direction from the center of the land or groove portion of the track. In practice, however, the track skipping is detected by a value smaller than ¼ of the above-mentioned ¼, namely by a range from a value smaller than the maximum value of the tracking error signals to a value larger than the minimum value thereof.

Either one of the output voltages of the reference voltage generation circuits 23, 25 for generating the upper limit reference voltages of the predetermined voltage ranges is selected by a switch 27 and is compared in a comparator 28 with the tracking error signal. Also either one of the output voltages of the reference voltage generation circuits 24, 26 for generating the lower limit reference voltages of the predetermined voltage ranges is selected by a switch 29 and is compared in a comparator 30 with the tracking error signal. The comparator 28 releases a high-level output signal when the tracking error signal exceeds the upper limit reference voltage while the comparator 30 releases a high-level output signal when the tracking error signal becomes smaller than the lower limit reference voltage, and the output signals of these comparators 28, 30 are logically summed in an OR gate 31 and supplied to the system process unit 18. In response to a high-level output signal from the OR gate 31, the system process unit 18 interrupts the recording or reproducing operation, as will be explained later in more details.

The system process unit 18 is a main control circuit of the optical information recording/reproducing apparatus of the present embodiment, and executes the information recording and reproduction by controlling various units of the apparatus. More specifically, the system process unit 18 executes on/off control of the focusing servo loop and of the tracking servo loop by controlling the switches 7 and 21, and also executes control for recording information on the optical disk 1 or reproducing the information recorded on the optical disk 1 by controlling a recording-reproducing circuit 32. This circuit 32 includes a circuit for modulating recording data from the system process unit 18 to generate a recording signal suitable for recording, and a laser driving circuit for driving the semiconductor laser in the optical head 2 according to the recording signal, and executes information recording by irradiating the optical disk 1 with the light beam from the semiconductor laser.

The recording-reproducing circuit 32 further includes a circuit for generating and demodulating reproduction signal based on the light reception signal from the photosensor in the optical head 2, and irradiates the optical disk 1 with a reproducing light beam from the optical head 2 under the control of the system process unit 18, thereby reproducing the recorded information based on the light reflected from the optical disk. The system process unit 18 also effects control for shifting the switches 13, 15 and the switches 27, 29 according to the kind of the optical disk loaded in the apparatus.

In the following there will be explained the functions of the present embodiment. At first, when the optical disk 1 is loaded in the apparatus, the system process unit 18 turns on the switch 7 to activate the focusing servo, and also turns on the switch 21 to activate the tracking servo, whereby the apparatus is rendered ready for reading information recorded on the optical disk. The system process unit 18, controlling an unrepresented seek control circuit, makes access to a control track which records information on the kind of the optical disk as explained before. Then the system process unit 18 controls the recording-reproducing circuit 32 to reproduce information of the control track, thereby reading information on the kind of the optical disk and identifying the kind of disk, and shifts the switches 13, 15 and the switches 27, 29 accordingly.

For example, if a land/groove recording optical disk is identified by the information on the kind, the system process unit 18 connects the switches 13, 15, 27, 29 respectively to X terminals thereof. Thus the comparators 14, 16 respectively receive $V_{LF}$, $-V_{LF}$ from the reference voltage generation circuit 9, 10, and generation of a defocus state is thereafter detected by monitoring whether the amplitude of the focusing error signal is within a range from $V_{LF}$ to $-V_{LF}$. Also the comparators 28, 30 respectively receive $V_{LF}$, $-V_{LF}$ from the reference voltage generation circuits 23, 24, and generation of a detracking state is thereafter detected by monitoring whether the amplitude of the tracking error signal is within a range from $V_{LT}$ to $-V_{LT}$. In this manner the switches are set according to the kind of the optical disk, and the recording of information or the reproduction of recorded information is rendered possible for the loaded optical disk.

In case an external vibration is applied in the course of information recording on the optical disk and the amplitude of the tracking error signal becomes larger than $V_{LT}$ because of the detracking of the light beam from the optical head 2, the comparator 28 releases a high-level output signal. Also when the amplitude of the tracking error signal becomes smaller than $-V_{LT}$, the comparator 30 releases a high-level output signal. In this manner, when the tracking error signal goes out of the range from $V_{LT}$ to $-V_{LT}$, a high-level output signals is released from the comparator 28 or 30 and is sent, as a detracking detection signal, to the system process unit 18 through the OR gate 17. Upon detection of the detracking state, the system process unit 18 controls the recording-reproducing circuit 32 to interrupt the recording operation for example by interrupting the modulating operation, and controls the laser driving circuit in the recording-reproducing circuit 32 to reduce the light output of the semiconductor laser to a level incapable of recording. There is thus executed control for interrupting the recording operation. Also in case a detracking state is detected in the course of the information reproducing operation for example by an external vibration, the system process unit 18 interrupts the reproducing operation in a similar manner as in the case of recording operation.

On the other hand, if the focusing error signal becomes larger than $V_{LF}$ or smaller than $-V_{LF}$ because of an external vibration applied in the course of information recording, a high-level output signal is released respectively from the comparator 14 or 16. When the focusing error signal goes out of the range from $V_{LF}$ to $-V_{LF}$, a high-level output signal is released from the comparator 14 or 16 and is sent, as a defocusing detection signal, to the system process unit 18 through the OR gate 17. Upon detection of the defocusing state, the system process unit 18 executes control to interrupt the recording operation for example by reducing the light output of the semiconductor laser as explained in the foregoing. Also in case a defocusing state is detected in the course of the information reproducing operation, the system process unit 18 interrupts the reproducing operation in a similar manner.

In the following there will be explained the functions in case an ordinary optical disk is loaded. If the optical disk loaded on the apparatus is identified as a land/groove recording optical disk, the system process unit 18 connects the switches 13, 15, 27, 29 respectively to Y terminals thereof. Thus the comparators 14, 16 respectively receive $V_{NF}$, $-V_{NF}$, and an uncontrolled focusing is thereafter detected by monitoring whether the amplitude of the focusing error signal is within a range from $V_{NT}$ to $-V_{NT}$. Also the comparators 28, 30 respectively receive $V_{NT}$, $-V_{NT}$, and generation of a track skipping state is thereafter detected by monitoring whether the amplitude of the tracking error signal is within a range from $V_{NT}$ to $-V_{NT}$. In this manner the setting of the switches is completed, and the recording of information or the reproduction of recorded information is rendered possible for the loaded optical disk.

In case an external vibration is applied in the course of information recording and the amplitude of the tracking error signal becomes larger than $V_{LT}$, the comparator 28 releases a high-level output signal. Also when the amplitude of the tracking error signal becomes smaller than $-V_{LT}$, the comparator 30 releases a high-level output signal. In this manner, when the tracking error signal goes out of the range from $V_{LT}$ to $-V_{LT}$, a high-level output signal is released from the comparator 28 or 30 and is sent, as a track skipping detection signal, to the system process unit 18. Upon detection of the track skipping, the system process unit 18 interrupts the recording operation for example by reducing the light output of the semiconductor laser, and turns off the tracking servo and the focusing servo by turning off the switches 7 and 21. Also in case a track skipping is detected in the course of the information reproducing operation, the system process unit 18 interrupts the reproducing operation and turns off the tracking servo and the focusing servo.

On the other hand, if the focusing error signal becomes larger than $V_{NF}$ or smaller than $-V_{NF}$ because of an external vibration applied in the course of information recording, a high-level output signal is released respectively from the comparator 14 or 16. When the focusing error signal goes out of the range from $V_{NF}$ to $-V_{NF}$ in this manner, a high-level output signal is released from the comparator 14 or 16 and is sent, as an uncontrolled focusing detection signal, to the system process unit 18. Upon detection of the uncontrolled focusing state, the system process unit 18 executes control to interrupt the recording operation for example by reducing the light output of the semiconductor laser as explained in the foregoing, and turns off the tracking servo and the focusing servo by turning off the switches 7 and 21. Also in case an uncontrolled focusing state is detected in the course of the information reproducing operation, the system process unit 18 interrupts the reproducing operation in a similar manner and turns off the tracking servo and the focusing servo.

In the present embodiment, as explained in the foregoing, when the land/groove recording optical disk is employed, the reference voltage range for detecting the detracking of the light spot is set as $V_{LT}$ to $-V_{LT}$ while that for detecting the defocusing of the light spot is set as $V_{LF}$ to $-V_{LF}$ and the recording or reproducing operation is interrupted in response to the detection of a detracking or defocusing state. It is therefore possible to prevent the erroneous recording or erasure in the adjacent track in the recording or reproducing operation, thereby avoiding data destruction. Also in the reproduction of information, it is possible to prevent erroneous reproduction of information, resulting from deterioration of the quality of the reproduced signal caused by the crosstalk from the adjacent track.

On the other hand, when the ordinary optical disk is employed, the reference voltage range for detecting the defocusing of the light spot is set as $V_{NT}$ to $-V_{NT}$ while that for detecting the defocusing of the light spot is set as $V_{NF}$ to $-V_{NF}$ and the track skipping or the uncontrolled focusing state is detected to similarly avoid the data destruction of the adjacent track or the erroneous reproduction resulting from the crosstalk from the adjacent track. Also in case of utilizing the ordinary optical disk, since selected suitable levels are selected for detecting the detracking or the defocusing, the recording or reproducing is not interrupted in response to a slight vibration such as caused the application of an external vibration, and unnecessary interruption of the operation of the apparatus can therefore be prevented. Therefore, by setting optimum detection levels for the detracking and the defocusing according to the kind of the optical disk, it is rendered possible to maintain the compatibility of the apparatus with the disks of different kinds and to achieve recording and reproducing operations in the optimum conditions for both the ordinal optical disk and the land/groove recording optical disk. Also in case of using the ordinary optical disk, it is rendered possible to prevent the destruction of the disk or the apparatus by turning off the tracking servo and the focusing servo in case a track skipping or an uncontrolled focusing state is detected.

Figure 4:
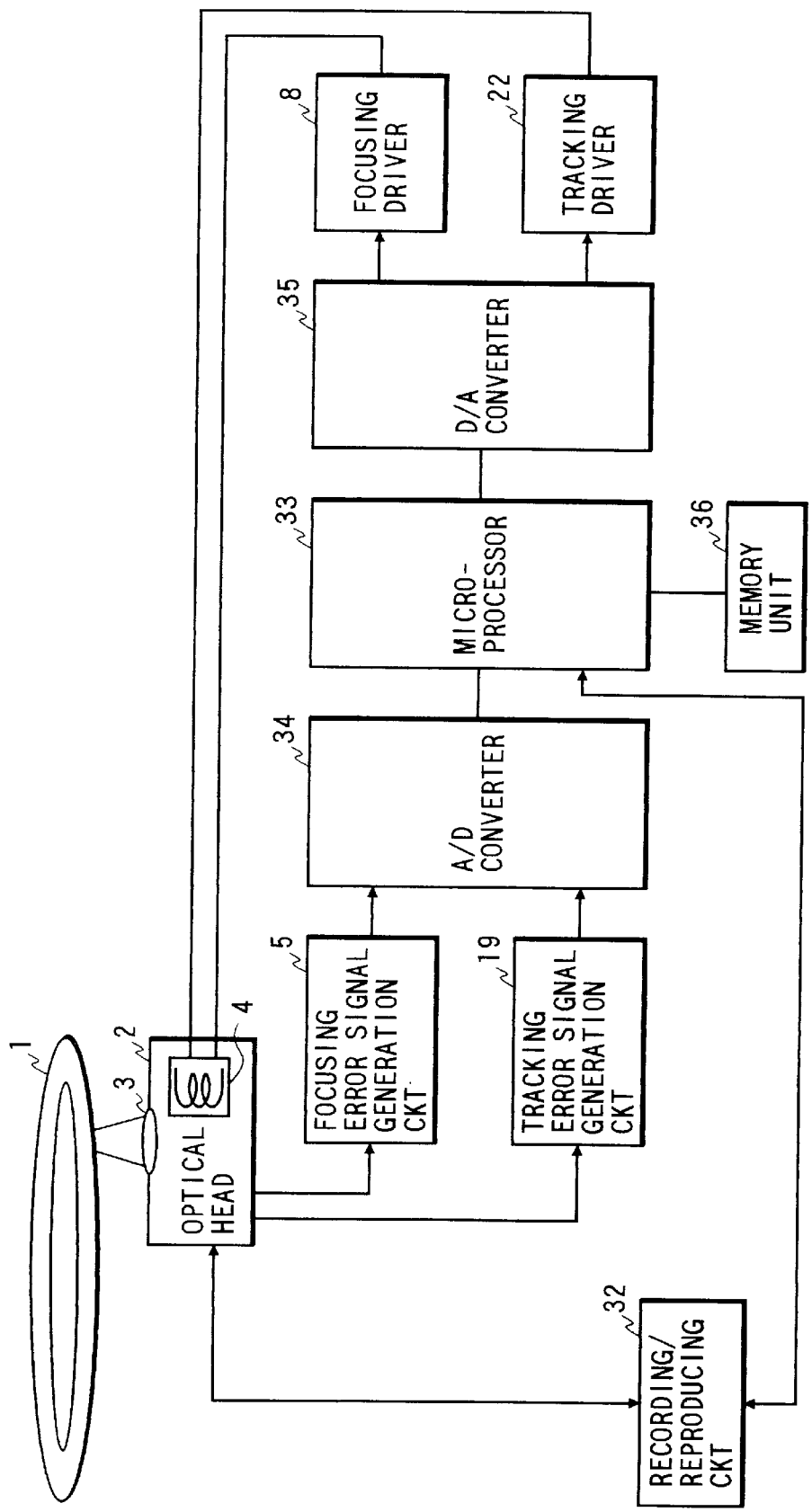
FIG. 4 is a block diagram of a second embodiment of the present invention.

In the following there will be explained a second embodiment of the present invention. FIG. 4 is a block diagram of this embodiment, in which the apparatus is controlled by the digital signal processing. In FIG. 4, components same as those in FIG. 3 are represented by same numbers and will not be explained further. Referring to FIG. 4, a microprocessor 33 performs the functions of the system process unit 18, the tracking servo, the focusing servo and the seek control of the optical head 2, and all the controls of the apparatus are executed by the digital signal processing of the microprocessor 33. The focusing error signal obtained in the focusing error signal generation circuit 5 is fetched into the microprocessor 33 at a predetermined sampling interval through an A/D converter 34. Also the tracking error signal obtained in the tracking error signal generation circuit 19 is fetched into the microprocessor 33 at a predetermined sampling interval through an A/D converter 34.

The microprocessor 33 stabilizes the focusing servo by executing a phase compensating calculation process in response to the value of the focusing error signal, according to a predetermined control program, and multiplies the value of the focusing error signal after the phase compensating calculation process with a predetermined constant, which determines the loop gain of the focusing servo loop. Thus processed focusing error signal is converted by a D/A converter 35 into an analog signal, which is supplied to the focusing driver 8. Thereafter, as explained in the foregoing, the focusing driver 8 drives the focusing actuator to move the objective lens 3 in the focusing direction, thereby controlling the focus position of the light beam.

The microprocessor 33 also effects a phase compensating calculation process and the multiplication with a predetermined constant for the value of the tracking error signal. Thus processed tracking error signal is converted by a D/A converter 35 into an analog signal, which is supplied to the tracking driver 22, which drives the tracking actuator to move the objective lens 3 in the tracking direction, thereby controlling the tracking position of the light beam. The microprocessor 33 executes the above-explained processes at a predetermined sampling interval, thereby achieving focusing control and tracking control in such a manner that the light beam emitted from the optical head 2 is focused to the recording layer and follows the track thereof on the rotating optical disk. A memory unit 36 stores constants required in the control of the microprocessor 33, including the reference voltages $V_{NF}$, $V_{LF}$ for detecting the defocus state and the uncontrolled focusing state and those $V_{NT}$, $V_{LT}$ for detecting the detracking state and the track skipping, already explained in the first embodiment.

In the following there will be explained the functions of the present embodiment with reference to FIG. 5. At first, when the optical disk is set on the apparatus, the microprocessor 33 initiates the focusing servo and tracking servo processes as explained in the foregoing. When the readout of information from the disk becomes possible, the microprocessor 33 effects seek control, thereby causing the optical head 2 to make access to the control track recorded with the kind information of the optical disk. Then it controls the recording-reproducing circuit 32 to read the above-mentioned information, thereby discriminating whether the disk is an ordinary optical disk or a land/groove recording optical disk, and stores the results of discrimination in the memory unit 36. Thus the apparatus is rendered capable of information recording on the disk or reproduction of the recorded information therefrom. Thereafter the process is executed according to the flow chart shown in FIG. 5, parallel to the focusing and tracking controls.

Now referring to FIG. 5, when the A/D converter 34 releases the tracking error signal, the microprocessor 33 stores the value thereof in a variable register $V_{TE}$ (S1), and, when the A/D converter 34 releases the focusing error signal, the microprocessor 33 stores the value thereof in a variable register $V_{FE}$ (S2). Then the microprocessor 33 discriminates the kind of the currently loaded disk (S3), by reading the kind information of the disk which is stored in the memory unit 36 as explained before, at the disk loading.

If a land/groove recording optical disk is identified, the sequence proceeds to a step S4 to compare the value of the tracking error signal in the variable register $V_{TE}$ and $V_{LT}$ stored in the memory unit 36 for discriminating whether a condition $|V_{TE}|>V_{LT}$ is satisfied. $V_{LT}$ is the reference voltage for detecting the detracking state as shown in FIG. 1, and the comparison of $|V_{TE}|$ and $V_{LT}$ identifies whether the tracking error signal is within the range from $V_{LT}$ to $-V_{LT}$ shown in FIG. 5. If $|V_{TE}|<V_{LT}$, the tracking error signal is within the predetermined range, indicating absence of the detracking state. Thus the sequence proceeds to a step S5 to compare the value of the focusing error signal in the variable register $V_{FE}$ and $V_{LF}$ stored in the memory unit 36 for discriminating whether a condition $|V_{FE}|>V_{LF}$ is satisfied.

$V_{LF}$ is the reference voltage for detecting the defocusing state as shown in FIG. 2, and the comparison of $|V_{FE}|$ and $V_{LF}$ identifies whether the focusing error signal is within the range from $V_{LF}$ to $-V_{LF}$. If $|V_{FE}|<V_{LF}$, the focusing error signal is within the predetermined range, indicating absence of the defocusing state. Thus the sequence proceeds to a step S7 to execute a next process. On the other hand, if the step S4 identifies a situation $|V_{TE}|>V_{LT}$, a detracking state of the light spot is identified and there is immediately executed a control for interrupting the recording or reproducing operation (S6). If the recording operation is in progress, the laser driving circuit is also controlled to reduce the light output of the semiconductor laser. Also if the step S5 identifies a situation $|V_{FE}|>V_{LF}$, a defocusing state of the light spot is identified and the recording or reproducing operation is interrupted in the step S6, and, if the recording operation is in progress, the light output of the semiconductor laser is reduced.

The detection of the detracking and defocusing states for the land/groove recording optical disk is thus completed, but, in consideration of the possibility of a track skipping or an uncontrolled focusing state, the following sequence starting from a step S7 is executed in continuation. At first $|V_{TE}|$ and $V_{NT}$ are compared to detect the track skipping of the light spot (S7). $V_{NT}$ is the reference voltage for detecting the track skipping as shown in FIG. 1. If $|V_{TE}|<V_{NT}$ in the step S7, the tracking error signal is within the predetermined range from $V_{NT}$ to $-V_{NT}$, indicating normal tracking control. If the tracking control is normal, the sequence proceeds to a step S8 to compare $|V_{FE}|$ and $V_{NF}$ for detecting the uncontrolled focusing state. $V_{NF}$ is the reference voltage for detecting the uncontrolled focusing state as shown in FIG. 2, and, if $|V_{FE}|<V_{NF}$, the focusing error signal is within the predetermined range from $-V_{NF}$ to $V_{NF}$, whereupon the focusing control is identified as normal and the present sequence is terminated.

On the other hand, if $|V_{TE}|>V_{NT}$ in the step S7, a track skipping is identified because the tracking error signal is out of the predetermined range, and there is immediately executed a control for interrupting the recording or reproducing operation (S9). If the recording operation is in progress, the light output of the semiconductor laser is also reduced. However, these operations will not be conducted if the recording or reproducing operation is already interrupted in the step S6. Then there are turned off the tracking servo (S10) and the focusing servo (S11), and an error process is subsequently executed. The error process re-starts the apparatus and records again the information that could not be recorded or reproduces again the information that could not be reproduced. A cycle of the process is thus completed, and, upon fetching of the tracking error signal and the focusing error signal in a next sampling cycle, there is executed the process in the identical manner. Thereafter the process shown in FIG. 5 is repeated at every predetermined sampling interval.

If the step S3 identifies that the loaded disk is an ordinary optical disk, the sequence proceeds to the step S7 for detecting the track skipping and the uncontrolled focusing state. The sequence starting from the step S7 will be explained only briefly, as it has already been explained in detail. At first $|V_{TE}|$ and $V_{NT}$ are compared to detect presence of the track skipping (S7), and, if absent, $|V_{FE}|$ and $V_{NF}$ are compared to detect presence of the uncontrolled focusing state (S8). In the absence of track skipping or uncontrolled focusing state, the present sequence is terminated immediately. If a track skipping or an uncontrolled focusing state is identified the recording or reproducing operation is interrupted (S9), and there are turned off the tracking servo (S10) and the focusing servo (S11), and an error process is subsequently executed. A cycle of the process is thus completed, and thereafter the process is repeated in the same manner at every predetermined sampling interval.

The present embodiment not only provides the advantages same as those of the first embodiment but also allows, because of the digital signal processing, to dispense with various circuit components such as the comparators, switches and OR gates for the tracking error signal and the focusing error signal, thereby simplifying the configuration of the apparatus.

In the following there will be explained a third embodiment of the present invention, which is adapted to employ, in addition to the ordinary optical disk and the land/groove recording optical disk, an optical disk which mixedly contains an area where the information recording and reproduction are conducted in both the land portion and the groove portion, and an area where the information recording and reproduction are conducted in either one of the land portion and the groove portion. The configuration of the third embodiment is same as that shown in FIG. 4. The track of the disk is usually divided into plural sectors and a preformat portion is provided at the head position of each sector for storing address information and a synchronizing pattern required for information recording and reproduction. In the present embodiment, such preformat portion is so constructed that the kind of the optical disk can be identified. In a disk partially containing land/groove recording sectors, the preformat portion is so constructed to identify whether the following sector is an ordinary recording area or a land/groove recording area. For example, the information indicating the kind of the disk and the kind of the sector is recorded on the preformat portion. Also the recording-reproducing circuit 32 is adapted, in reproducing a preformat portion of the disk, to provide the microprocessor 33 with information indicating that the light spot is passing on the preformat portion and information indicating the kind of the disk and the sector.

In the following there will be explained the functions of the present embodiment with reference to FIG. 6. In this embodiment, when the optical disk is set on the apparatus, the microprocessor 33 initiates the focusing servo and tracking servo processes to enable the recording and reproducing operations. Thereafter the microprocessor 33 executes the process shown in FIG. 6, parallel to the focusing and tracking controls. It is assumed that an aforementioned disk, mixedly containing the ordinary recording area and the land/groove recording area, is loaded on the apparatus. Referring to FIG. 6, the microprocessor 33 at first discriminates, based on the information from the recording-reproducing circuit 32, whether a preformat portion at the head of a sector is being reproduced (S1). If a preformat portion is being reproduced, the microprocessor 33 discriminates the kind of the sector, namely whether the sector is an ordinary recording area or a land/groove recording area (S2), based on the information indicating the kind of the sector, recorded in the preformat portion as explained before.

If the sector is a land/groove recording sector, a D flag (indicating the kind of the sector) provided in the memory unit 36 is set at a value indicating a land/groove recording area (S3). If the sector is an ordinary sector, the D flag is set at a value indicating such ordinary sector (S4). Upon completion of the reproduction of the preformat portion, the microprocessor 33 stores the value of the tracking error signal from the A/D converter 34 in the variable register $V_{TE}$ (S5) and also stores the value of the focusing error signal in the variable register $V_{FE}$ (S6). Then it discriminates whether the sector is a land/groove recording area, based on the state of the D flag in the memory unit 36 (S7), and, according to the result of discriminates executes the detection of the detracking and defocusing states or of the track skipping and uncontrolled focusing states.

The sequence according to the result of discrimination of the step S7 will be explained only briefly, as it is same as shown in FIG. 5. At first, if the sector is identified as a land/groove recording sector, the microprocessor 33 compares the value $|V_{TE}|$ of the tracking error signal obtained in the step S5 and $V_{LT}$ stored in the memory unit 36 to detect the detracking state of the light spot (S8). It also compares the value $|V_{FE}|$ of the focusing error signal obtained in the step S6 and $V_{LF}$ stored in the memory unit 36 to detect the defocusing state (S9). In presence of a detracking state or a defocusing state, the recording or reproducing operation is immediately interrupted (S10). In presence of a detracking state or a defocusing state, there is executed in continuation a process starting from a step S11.

In consideration of the possibility of a track skipping or an uncontrolled focusing state, the following sequence starting from a step S11 is executed in continuation. At first the microprocessor 33 compares $|V_{TE}|$ and $V_{NT}$ stored in the memory unit 36 to detect the track skipping (S11). Also it compares $|V_{FE}|$ and $V_{NF}$ stored in the memory unit 36 to detect the uncontrolled focusing state (S12). In absence of the track skipping and the uncontrolled focusing state, the sequence is terminated, but, if the track skipping or the uncontrolled focusing state is present, the recording or reproducing operation is immediately interrupted (S13). However, such operation will not be conducted if the recording or reproducing operation is already interrupted in the step S10 because of a detracking or defocusing state. Then there are turned off the tracking servo (S14) and the focusing servo (S15), and the error process as explained above is subsequently executed.

If the step S7 identifies that the sector is an ordinary sector, the sequence directly proceeds to the step S11 to detect the track skipping and uncontrolled focusing states. More specifically, the step S11 discriminates the track skipping as explained before, and the step S12 discriminates the uncontrolled focusing state. If the track skipping and uncontrolled focusing state are absent, the sequence is immediately terminated, but, if present, the recording or reproducing operation is immediately terminated (S13). Then there are turned off the tracking servo (S14) and the focusing servo (S15), and the error process is subsequently executed. A cycle of the process is thus completed, and thereafter the process is repeated in the same manner at every predetermined sampling interval. Also in case an ordinary optical disk or a land/groove recording optical disk is loaded, the kind of the disk can be identified from information recorded on the preformat portion at the head of each sector, so that the detection levels for detecting the detracking and defocusing states can be set matching the kind of the disk, according to the process shown in FIG. 6.

The present embodiment, providing the preformat portion with information indicating the kind of the disk or the sector and switching the detection levels for the detracking and defocusing states according to such information, allows to maintain the compatibility of the apparatus with three types of disks, namely the ordinary disk, the land/groove recording disk and the disk mixedly containing the ordinary recording area and the land/groove recording area. It is thus rendered possible to detect the detracking or defocusing of the light spot with the optimum detecting levels respectively for the disks of such three kinds, in the same manner as in the first and second embodiments, thereby preventing unnecessary interruption of the function of the apparatus.

In the third embodiment, the tracking servo and the focusing servo are turned on in the stand-by state in which the recording or reproducing operation is conducted, and in such situation, the D flag is preferably set at a value indicating the ordinary recording area. In this manner, even if an external perturbation such as vibration is applied in the standby state, the steps S14 and S15 in FIG. 6 turn off the tracking servo and the focusing servo to prevent the damage in the disk or the destruction of the apparatus.

As explained in the foregoing, the present invention switches the detection levels for detecting the detracking or defocusing of the light spot according to the kind of the recording medium or of the predetermined recording area therein, and allows therefore to detect the detracking state and the defocusing state with the optimum detection levels respectively for the ordinary recording medium, the land/groove recording medium and the recording medium partially containing the land/groove recording area. Therefore in the use of the ordinary recording medium, as the detection levels can be selected accordingly, the track skipping or the uncontrolled focusing state is not detected by a slight vibration and there can be prevented unnecessary interruption of the recording or reproducing operation.

What is claimed is:

1. An optical information recording/reproducing apparatus capable of executing a first recording method for recording information on either one of the land portion and the groove portion and a second recording method for recording information on both of the land portion and the groove portion, the apparatus comprising:

means for irradiating a light beam for executing the information recording;

means for generating a tracking error signal and/or a focusing error signal from the reflected light of said light beam;

means for detecting a tracking error state and/or a focusing error state of said light beam, by comparing the level of said error signal with a reference value; and means for selecting said reference value from a plurality of reference values according to said recording method.

2. An apparatus according to claim 1, wherein said reference value in said first recording method is larger than said reference value in said second recording method.

3. An apparatus according to claim 2, wherein said reference value for detecting said tracking error state in said second recording method is set at a level corresponding to about ¼ of the distance between the adjacent land portions or the adjacent groove portions.

4. An apparatus according to claim 2, wherein said reference value for detecting said focusing error state in said second recording method corresponds to a defocus amount where the width of a recording mark to be formed becomes equal to or larger than the width of the land portion or the groove portion.

5. An optical information recording/reproducing method capable of executing a first recording method for recording information on either one of the land portion and the groove portion and a second recording method for recording information on both of the land portion and the groove portion, the method comprising steps of:

irradiating a light beam for executing said information recording;

generating a tracking error signal and/or a focusing error signal from the reflected light of said light beam;

detecting a tracking error state and/or a focusing error state of said light beam, by comparing the level of said error signal with a reference value; and selecting said reference value from a plurality of reference values according to said recording method.

\* \* \* \* \*

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

<u>ON THE COVER PAGE</u> item [57], "ABSTRACT",
     line 7, "and/or focusing" should read --and/or a focusing--; and
     line 11, "and/or focusing" should read --and/or a focusing--.

<u>COLUMN 1</u>:

line 15, "such" should read --such an--;
    line 24, "known" should read --known a--;
    line 25, "the" should be deleted;
    line 34, "such case, the" should read --such a case,--;
    line 46, "Consequently" should read --Consequently,--;
    line 58, "recorded" should read --recorded on--;
    line 61, "following" should read --following,--; and
    line 62, "details." should read --detail.--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 2:

line 1, "FIG. 1" should read --FIG. 1,--;
    line 15, "Also" should read --Also,--;
    line 20, "recorded" should read --also recorded--;
    line 21, "also" should be deleted;
    line 25, "in case" should read --in the case-- and "recording, the" should read --recording,--;
    line 27, "Also" should read --Also,--;
    line 32, "such situation" should read --such a situation--;
    line 40, "in case" should read --in the case--;
    line 55, "Such" should read --Such a--;
    line 56, "called" should read --called an--;
    line 60, "of recording or erasing" should read --of a recording or an erasing--;
    line 63, "such case," should read --such a case,--; and
    line 65, "Also such" should read --Also, such a--.

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 3:

line 2, "due" should read --due,--; and
    line 3, "example" should read --example,--.

COLUMN 4:

line 21, "Now the" should read --Now, the-- and "clarified" should read --discussed--;
    line 57, "a/focusing" should read --a focusing--; and
    line 60, "Then" should read --Then,--.

COLUMN 5:

line 1, "kind of the" should read --kind of--;
    line 2, "in" should read --in the--;
    line 3, "in" should read --in the--;
    line 12, "kind of the" should read --kind of--;
    line 23, "in" (second occurrence) should read --in the--;
    line 24, "having" should read --having a--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 5 (cont'd):

line 29, "case" should read --case,--;
    line 33, "Also" should read --Also,--;
    line 40, "Also" should read --Also,--;
    line 61, "interruptes" should read --interrupts--; and
    line 63, "details." should read --detail.--.

COLUMN 6:

line 1, "signals" should read --signal--;
    line 4, "Then" should read --Then,--;
    line 13, "kind of the" should read --kind of--;
    line 14, "in case" should read --in the case--;
    line 15, "in case" should read --in the case--;
    line 24, "in case" should read --in the case--, and "the.land/groove" should read --the land/groove--;
    line 25, "having" should rad --having a--;
    line 34, "sequently" should read --sequently,--;
    line 46, "of amplitude" should read --of the amplitude--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 6 (cont'd):

line 48, "of amplitude" should read --of the amplitude--;
    line 54, "Consequently" should read --Consequently,--;

COLUMN 7:

line 3, "Also either" should read --Also, either--;
    line 17, "details." should read --detail.--;
    line 36, "demodulating reproduction" should read --demodulating a reproduction--;
    line 42, "disk." should read --disk 1.--;
    line 44, "kind of the" should read --kind of--;
    line 46, "following there" should read --following, there--;
    line 54, "kind of the" should read --kind of--;
    line 55, "Then the" should read --Then, the--;
    line 58, "kind of the" should read --kind of--;
    line 64, "29 respectively to" should read --29, respectively, to--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 7 (cont'd):

line 65, "Thus the" should read --Thus, the--; and
    line 67, "circuit 9," should read --circuits 9,--.

COLUMN 8:

line 3, "Also the" should read --Also, the--;
    line 6, "manner the" should read --manner, the--;
    line 7, "kind of the" should read --kind of--;
    line 14, "Also" should read --Also,--;
    line 19, "signals" should read --signal--;
    line 23, "operation" should read --operation,--;
    line 24, "example" should read --example,--;
    line 27, "executed" should read --executed a--;
    line 28, "Also in" should read --Also, in--;
    line 29, "operation for example" should read
--operation, for example,--;
    line 32, "recording" should read --a recording--;
    line 43, "operation for example" should read
--operation, for example,--;
    line 45, "Also in" should read --Also, in--;
    line 49, "following" should read --following,--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 8 (cont'd):

line 50, "case" should read --the case--;
    line 53, "29 respectively to" should read --29, respectively, to--;
    line 54, "Thus the" should read --Thus, the-- and "16 respectively" should read --16, respectively,--;
    line 58, "Also the" should read --Also, the--;
    line 59, "30 respectively" should read --30, respectively,--; and
    line 62, "manner" should read --manner,--.

COLUMN 9:

line 2, "Also when" should read --Also, when--;
    line 9, "operation for example" should read --operation, for example,--;
    line 12, "Also in" should read --Also, in--;
    line 26, "operation" should read --operation,--;
    line 27, "example" should read --example,--;
    line 30, "Also in" should read --Also, in--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 9 (cont'd):

line 44, "Also in" should read --Also, in--;
    line 57, "Also in case" should read --Also, in the case--;
    line 58, "selected" should be deleted;
    line 61, "as caused the" should read --as that caused by the--; and
    line 65, "kind of the" should read --kind of--.

COLUMN 10:

line 3, "Also in case" should read --Also, in the case--;
    line 7, "following there" should read --following, there--;
    line 10, "components same" should read --components the same--;
    line 11, "by same" should read --by the same--;
    line 18, "fetched" should read --entered--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 10 (cont'd):

line 20, "Also the" should read --Also, the--;
    line 22, "fetched" should read --entered--;
    line 30, "Thus processed" should read --Thus, a--;
    line 38, "the" should be deleted;
    line 40, "Thus processed" should read --Thus, a processed--;
    line 48, "to" should read --onto--;
    line 53, "those" should read --those of--;
    line 57, "following there" should read --following, there--; and
    line 65, "kind information" should read --kind of information--.

COLUMN 11:

line 2, "of discrimination" should read --of the discrimination--;
    line 3, "Thus the" should read --Thus, the--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 11 (cont'd):

line 5, "Thereafter the" should read --Thereafter, the--;
    line 12, "Then the" should read --Then, the--;
    line 14, "kind information" should read --kind of information--;
    line 25, "indicating absence" should read --indicating an absence--;
    line 26, "Thus the" should read --Thus, the--;
    line 35, "indicating absence" should read --indicating an absence--;
    line 34, "Thus the" should read --Thus, the--; and
    line 41, "Also if" should read --Also, if--.

COLUMN 12:

line 7, "Then there" should read --Then, there--;
    line 12, "fetching" should read --accessing--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 12 (cont'd):

line 13, "there is executed the" should read --the process is executed--;
    line 14, "process in" should read --in-- and "Thereafter" should read --Thereafter,--;
    line 22, "detect presence" should read --detect a presence--;
    line 24, "detect presence" should read --detect a presence--;
    line 25, "of track skipping or uncontrolled" should read --of a track skipping or an uncontrolled--;
    line 27, "identified the" should read --identified, the--;
    line 28, "there are turned off" should be deleted;
    line 29, "servo (S11)," should read --servo (S11) are turned off,--;
    line 34, "advantages" should read --same--;
    line 35, "same" should read --advantages--;
    line 41, "following" should read --following,--;
    line 50, "is same" should read --is the same--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 12 (cont'd):

line 55, "such preformat" should read --such a preformat--;
    line 61, "of the disk" should read --of disk-- and "of the sector" should read --of sector--;
    line 62, "Also" should read --Also,--;
    line 66, "the" (second occurrence) should be deleted; and
    line 67, "the" should be deleted.

COLUMN 13:

line 1, "following" should read --following,--;
    line 6, "Thereafter" should read --Thereafter,--;
    line 15, "of the sector," should read --of sector,--;
    line 18, "of the sector," should read --of sector,--;
    line 20, "of the sector)" should read --of sector)--;
    line 23, "such" should read --such an--;
    line 28, "Then" should read --Then,--;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 13 (cont'd):

line 31, "result of discriminates executes" should read --result, executes--;
    line 34, "of discrimination" should read --of the discrimination--;
    line 35, "is" should read --is the--;
    line 43, "In" should read --In the--;
    line 45, "In" should read --In the--;
    line 53, "Also" should read --Also,--;
    line 55, "In" should read --In the--;
    line 60, "such" should read --such an--;
    line 62, "Then" should read --Then,--;
    line 63, "there are turned off" should be deleted; and
    line 64, "servo (S15), and" should read --servo (S15) are turned off, and--.

COLUMN 14:

line 8, "Then" should read --Then,-- and "there are turned off" should be deleted;

UNITED STATES PATENT AND TRADEMARK OFFICE
CERTIFICATE OF CORRECTION

PATENT NO. : 5,771,214

DATED : June 23, 1998

INVENTOR : YOSHIHIRO SAGA

It is certified that error appears in the above-identified patent and that said Letters Patent is hereby corrected as shown below:

COLUMN 14 (cont'd):

line 9, "servo (S15), and" should read --servo (S15) are turned off, and--;
line 12, "Also" should read --Also,--;
line 14, "of the disk" should read --of disk--;
line 18, "of the disk" should read --of disk--;
line 20, "of the disk or the sector" should read --of disk or sector--;
line 22, "allows" should read --provides the ability--;
line 28, "levels respectively" should read --levels, respectively,--;
line 35, "such" should read --such a--;
line 37, "as" should read --as a--;
line 40, "in" should read --to--;
line 46, "levels" should read --levels,--;
line 47, "respectively" should read --respectively,--; and
line 49, "Therefore" should read --Therefore,--.

Signed and Sealed this

Twelfth Day of October, 1999

Attest:

Q. TODD DICKINSON

*Attesting Officer*      *Acting Commissioner of Patents and Trademarks*